US011716703B2

United States Patent
Li et al.

(10) Patent No.: US 11,716,703 B2
(45) Date of Patent: Aug. 1, 2023

(54) PAGING METHOD AND PAGING DEVICE

(71) Applicant: Huawei Technologies Co., Ltd., Shenzhen (CN)

(72) Inventors: Bingzhao Li, Beijing (CN); Yan Wang, Beijing (CN); Wei Quan, Beijing (CN); Jian Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/272,578

(22) Filed: Feb. 11, 2019

(65) Prior Publication Data

US 2019/0208497 A1 Jul. 4, 2019

Related U.S. Application Data (63) Continuation of application No. PCT/CN2016/095062, filed on Aug. 12, 2016.

(51) Int. Cl.
*H04W 68/00* (2009.01)
*H04W 68/02* (2009.01)
(Continued)

(52) U.S. Cl.
CPC ..... *H04W 68/005* (2013.01); *H04W 36/0033* (2013.01); *H04W 48/20* (2013.01); *H04W 68/02* (2013.01); *H04W 76/27* (2018.02)

(58) Field of Classification Search
CPC ........ H04W 8/04; H04W 8/08; H04W 68/02; H04W 8/06; H04W 8/30; H04W 72/042; H04W 68/00; H04W 28/06; H04W 48/18; H04W 76/10; H04W 4/12; H04W 24/02; H04W 74/0833; H04W 72/1215;
(Continued)

(56) References Cited

U.S. PATENT DOCUMENTS 9,191,917 B2 * 11/2015 Beygzadeh ........... H04W 68/00
9,247,471 B2 * 1/2016 Velev .................... H04W 76/36
(Continued)

FOREIGN PATENT DOCUMENTS

CN 102202394 A 9/2011
CN 102340754 A * 2/2012 ............ H04W 28/06
(Continued)

OTHER PUBLICATIONS

China Unicom, "RAN-based paging for light connection," 3GPP TSG-RAN WG2 Meeting #94, R2-163803, Nanjing, China, May 23-27, 2016, 2 pages.
(Continued)

*Primary Examiner* — Ayaz R Sheikh
*Assistant Examiner* — Louis Samara
(74) *Attorney, Agent, or Firm* — Slater Matsil, LLP (57) ABSTRACT

Embodiments of the present application provide a paging method, applied to a wireless communications system. When downlink data to a terminal reaches a first access network device from a core network, the first access network device is triggered to determine a paging parameter of the terminal, and to send, based on the paging parameter, a paging message to the terminal through the first access network device or a second access network device.

13 Claims, 5 Drawing Sheets

(51) Int. Cl.
  *H04W 76/27* (2018.01)
  *H04W 36/00* (2009.01)
  *H04W 48/20* (2009.01)

(58) Field of Classification Search
  CPC ..... H04W 52/40; H04W 72/56; H04W 72/29; H04M 1/72569; H04L 65/105; H04L 1/0079; H04L 67/322
  See application file for complete search history.

(56) References Cited

U.S. PATENT DOCUMENTS

| | | | | |
|---|---|---|---|---|
| 2007/0149190 | A1* | 6/2007 | Matsuhashi | H04W 8/08 455/432.1 |
| 2008/0025250 | A1* | 1/2008 | Wang | H04W 68/02 370/328 |
| 2009/0129307 | A1* | 5/2009 | Akhtar | H04L 1/0079 370/312 |
| 2011/0207466 | A1* | 8/2011 | Hegge | H04W 74/0833 455/450 |
| 2011/0310804 | A1* | 12/2011 | Beygzadeh | H04W 68/00 370/328 |
| 2012/0238305 | A1* | 9/2012 | Xiao | H04W 52/40 455/509 |
| 2014/0101303 | A1* | 4/2014 | Gupta | H04W 68/02 709/224 |
| 2014/0321376 | A1* | 10/2014 | Damnjanovic | H04W 72/1215 370/329 |
| 2014/0349635 | A1* | 11/2014 | Lin | H04W 72/29 455/418 |
| 2015/0019746 | A1* | 1/2015 | Shatzkamer | H04W 76/10 709/228 |
| 2015/0024765 | A1* | 1/2015 | Xu | H04W 4/12 455/450 |
| 2015/0029921 | A1* | 1/2015 | Lu | H04W 76/28 370/311 |
| 2015/0141030 | A1* | 5/2015 | Basu-Mallick | H04W 72/56 455/452.1 |
| 2015/0215768 | A1 | 7/2015 | Dong et al. | |
| 2015/0271093 | A1* | 9/2015 | Cui | H04W 4/70 370/329 |
| 2016/0174188 | A1* | 6/2016 | Kim | H04L 65/1045 455/458 |
| 2016/0205661 | A1* | 7/2016 | Ryu | H04W 72/23 455/458 |
| 2019/0045351 | A1* | 2/2019 | Zee | H04W 76/11 |
| 2019/0380122 | A1* | 12/2019 | Jung | H04W 72/51 |

FOREIGN PATENT DOCUMENTS

| | | |
|---|---|---|
| CN | 102948233 A | 2/2013 |
| CN | 103813358 A | 5/2014 |
| CN | 103857038 A | 6/2014 |
| CN | 104247553 A | 12/2014 |
| CN | 105264958 A | 1/2016 |
| CN | 105557045 A | 5/2016 |
| CN | 109565785 A | 4/2019 |
| RU | 2370911 C2 | 10/2009 |
| RU | 2015115961 A | 11/2016 |
| WO | 2011162667 A1 | 12/2011 |
| WO | 2014013057 A1 | 1/2014 |
| WO | 2014171786 A1 | 10/2014 |

OTHER PUBLICATIONS

Nokia et al., "Paging for light connection," 3GPP TSG-RAN WG3 Meeting #92, R3-161352, Nanjing, China, May 23-27, 2016, 6 pages.

3rd Generation Partnership Project; Technical Specification Group Radio Access Network; Evolved Universal Terrestrial Radio Access Network (E-UTRAN); S1 Application Protocol (S1AP) (Release 13), 3GPP TS 36.413 V13.3.0 (Jun. 2016), 331 pages.

Huawei, et al., "On RAN initiated paging," 3GPP TSG-RAN WG2 Meeting #94, R2-163932, Nanjing, China, May 23-27, 2016, 5 pages.

Catt, "MME initiated paging for light connected UE," 3GPP TSG RAN WG3 Meeting #92, R3-161114, Nanjing, China, May 23-27, 2016, 3 pages.

Intel, "Paging coordination for extended Idle mode DRX," Change Request, SA WG2 Meeting #110, S2-152389, Debrovnik, Croatia, Jul. 6-10, 2015, 37 pages.

Catt, "Paging in light connection", 3GPP TSG RAN WG2 Meeting #94, R2-163474, May 23-27, 2016, 3 pages, Nanjing, China.

Huawei et al., "Evaluation on RAN initiated paging and MME initiated paging", 3GPP TSG-RAN WG2 Meeting #94, R2-163930, May 23-27, 2016, 12 pages, Nanjing, China.

* cited by examiner

FIG. 6

PAGING METHOD AND PAGING DEVICE

CROSS-REFERENCE TO RELATED APPLICATIONS

This application is a continuation of International Application No. PCT/CN2016/095062, filed on Aug. 12, 2016, the disclosure of which is hereby incorporated by reference in its entirety.

TECHNICAL FIELD

The present application relates to the field of wireless communications technologies, and in particular, to a paging method and a paging device.

BACKGROUND

A wireless communications system includes a core network device, at least one access network device managed by the core network device, and a terminal served by a certain access network device in the at least one access network device. A telecommunications operator may manage the core network device and the access network device through a network management system operating on the wireless communications system. After the terminal accesses the wireless communications system, to save resources, the terminal does not always keep a data connection from the at least one access network device to the core network device. A path in a direction from the core network device, to the access network device, and then to the terminal, may be referred to as a downlink. Herein, data transmitted on the downlink is referred to as downlink data. When downlink data (including downlink service data or downlink signaling) to the terminal reaches the core network device, the core network device is triggered to page the terminal within a paging area, so as to complete sending the downlink data to the terminal. As the terminal moves within the coverage of the at least one access network device, a paging area of the terminal changes, and the terminal notifies the core network device of the changed paging area, so that the core network device can page the terminal correctly.

However, a manner in which the terminal notifies the core network device of the changed paging area brings about a large quantity of signaling interaction between the terminal and a serving access network device of the terminal and between the serving access network device and the core network device, thereby reducing system performance of the wireless communications system.

SUMMARY

Embodiments of the present application disclose a paging method and a paging device, so as to reduce signaling interaction between an access network and a core network when the core network participates in a paging process of a terminal.

A first aspect of the embodiments of the present application provides a paging method. The method includes, when downlink data to a terminal reaches a first access network device from a core network device, determining, by the first access network device, a paging parameter, where the paging parameter is used to send a paging message to the terminal, and the downlink data is downlink service data or downlink signaling. The method also includes sending, by the first access network device based on the paging parameter of the terminal, a paging message to the terminal through the first access network device or a second access network device.

In the first aspect, the downlink data to the terminal reaches the first access network device, and triggers the first access network device to determine the paging parameter. In a wireless communications system, a subject for determining the paging parameter is changed to an access network side, without needing the core network device to determine the paging parameter, thereby reducing a large quantity of signaling interaction between the core network device and the access network device. In addition, after the terminal has been paged, the access network device may directly send the downlink data to the terminal, thereby reducing waiting time for the core network device to send the downlink data.

Based on the first aspect, in a first possible implementation of the first aspect, the paging parameter includes a paging priority of the terminal; and the determining, by the first access network device, a paging parameter of the terminal includes: determining, by the first access network device, the paging priority of the terminal based on a mapping relationship between a type of the downlink data and the paging priority.

In the first possible implementation of the first aspect, the first access network device determines the priority of the terminal through the type of the downlink data to the terminal, so as to perform classified paging on the terminal based on the priority of the terminal.

Based on the first possible implementation of the first aspect, in a second possible implementation of the first aspect, the method further includes: receiving, by the first access network device, the mapping relationship between the type of the downlink data and the paging priority, where the mapping relationship is sent by the core network device or a network management system.

In the second possible implementation of the first aspect, the mapping relationship that is used by the first access network device and that is between the type of the downlink data to the terminal and the paging priority of the terminal is configured and sent to the first access network device by the core network device or the network management system. The core network device or the network management system may send the mapping relationship before the downlink data to the terminal reaches the first access network device, or send the mapping relationship with the downlink data to the terminal to the first access network device when the downlink data to the terminal reaches the first access network device. Therefore, a delay may be avoided, where the delay is brought about because the first access network device requests the mapping relationship from the core network device or the network management system when the downlink data to the terminal reaches the first access network device.

Based on the first possible implementation or the second possible implementation of the first aspect, in a third possible implementation of the first aspect, the type of the downlink data includes one or a combination of the following: an allocation and retention priority (ARP) type, a bearer type of the downlink data or a bearer identity of the downlink data, non-access stratum (NAS) signaling, and circuit switched domain NAS stratum signaling.

Based on any one of the first aspect to the third possible implementation of the first aspect, in a fourth possible implementation of the first aspect, the sending, by the first access network device based on the paging parameter of the terminal, a paging message to the terminal through a second access network device includes: sending, by the first access network device, the paging parameter of the terminal to the second access network device, where the paging parameter is used by the second access network device to send the paging message to the terminal based on the paging parameter.

In the fourth possible implementation of the first aspect, the terminal is not under serving coverage of the first access network device, and the first access network device forwards the paging parameter to another access network device (including the second access network device), and sends the paging message to the terminal by separately using these access network devices.

Based on the fourth possible implementation of the first aspect, in a fifth possible implementation of the first aspect, a message carrying the paging parameter further includes at least one of the following: a context of the terminal, a list of paging cells, and a key of the terminal.

In the fifth possible implementation of the first aspect, the context of the terminal included in the message carrying the paging parameter may enable the terminal, after being paged, not to initiate context connection establishment. The list of paging cells may enable the second access network device to narrow a paging range, so as to determine a location of the terminal more rapidly. The key of the terminal may be used when the terminal, after being paged, directly receives the downlink data after the key is notified to the terminal, and the terminal does not need to initiate a key request operation after the terminal has been paged.

Based on any one of the first aspect to the third possible implementation of the first aspect, in a sixth possible implementation of the first aspect, the method further includes: receiving, by the first access network device, a first paging acknowledgement message from the terminal; and confirming, by the first access network device based on the first paging acknowledgement message, that the terminal has been paged, and sending the downlink data to the terminal, where the terminal is under serving coverage of the first access network device.

In the sixth possible implementation of the first aspect, the first access network device is a serving access network device of the terminal. The first access network device directly initiates paging for the terminal after determining the paging parameter.

Based on the first aspect to the fifth possible implementation of the first aspect, in a seventh possible implementation of the first aspect, the method further includes: receiving, by the first access network device, a second paging acknowledgement message from the second access network device, where the second paging acknowledgement message includes a data forwarding address of the second access network device; and confirming, by the first access network device based on the second paging acknowledgement message, that the terminal has been paged, and sending the downlink data to the terminal through the second access network device, where the terminal is under serving coverage of the second access network device, and the first access network device and the second access network device are located in a same paging area of the terminal.

In the seventh possible implementation of the first aspect, the second access network device is a serving access network device of the terminal. After the first access network device pages the terminal through the second access network device, the second access network device feeds back a result that the terminal has been paged.

Based on any one of the first aspect to the fifth possible implementation of the first aspect, in an eighth possible implementation of the first aspect, the method further includes: receiving, by the first access network device, a second paging acknowledgement message from the second access network device, where the second paging acknowledgement message includes a data forwarding address of a third access network device; and confirming, by the first access network device based on the second paging acknowledgement message, that the terminal has been paged, and sending the downlink data to the terminal through the third access network device, where the terminal is under serving coverage of the third access network device, the second access network device and the third access network device are located in a same paging area of the terminal, and the first access network device is not located in a paging area of the terminal.

In the eighth possible implementation of the first aspect, the third access network device is a serving access network device of the terminal. The first access network device first uses the second access network device, and then the second access network device uses the third access network device located in the same paging area as the second access network device to page the terminal. In addition, the second access network device feeds back, to the first access network device, a result that the terminal has been paged.

Based on the first aspect to the seventh possible implementation of the first aspect, in a ninth possible implementation of the first aspect, the downlink data is the downlink signaling, and the method further includes: sending, by the first access network device, the downlink signaling to the second access network device, where the first access network device and the second access network device are located in the same paging area. Optionally, the downlink signaling may be sent before the first access network device confirms that the terminal has been paged.

In the ninth possible implementation of the first aspect, the first access network device may send the downlink signaling to the second access network device, without needing a data forwarding address of the serving access network device of the terminal. If the third access network device is the serving access network device of the terminal, the second access network device sends the downlink signaling to the third access network device, and then the third access network device sends the downlink signaling to the terminal when paging the terminal.

A second aspect of the embodiments of the present application provides a paging method. The method includes receiving, by a second access network device, a paging parameter determined by a first access network device after downlink data to a terminal reaches the first access network device. The paging parameter is used to send a paging message to the terminal, and the downlink data is downlink service data or downlink signaling. The method also includes sending, by the second access network device based on the paging parameter, a paging message to the terminal through the second access network device or a third access network device.

In the second aspect, after the downlink data to the terminal reaches the first access network device, the first access network device determines the paging parameter and sends the paging parameter to the second access network device, and then the second access network device directly pages the terminal or pages the terminal through the third access network device.

Based on the second aspect, in a first possible implementation of the second aspect, the paging parameter is a paging priority of the terminal.

In the first possible implementation of the second aspect, the second access network device may page the terminal based on the paging priority of the terminal.

Based on the second aspect or the first possible implementation of the second aspect, in a second possible implementation of the second aspect, a message carrying the paging parameter further includes at least one of the following: a context of the terminal, a list of paging cells, and a key of the terminal.

In the second possible implementation of the second aspect, the context of the terminal included in the message carrying the paging parameter may enable the terminal, after being paged, not to initiate context connection establishment. The list of paging cells may enable the second access network device to narrow a paging range, so as to determine a location of the terminal more rapidly. The key of the terminal may be used when the terminal, after being paged, communicates with a network side after the key is notified to the terminal.

Based on any one of the second aspect to the second possible implementation of the second aspect, in a third possible implementation of the second aspect, the method further includes: after the second access network device confirms that the terminal has been paged, sending, by the second access network device, a second paging acknowledgement message to the first access network device, where the second paging acknowledgement message includes a data forwarding address of the second access network device, where the terminal is under serving coverage of the second access network device, and the first access network device and the second access network device are located in a same paging area of the terminal.

In the third possible implementation of the second aspect, the second access network device is a serving access network device of the terminal. After the first access network device pages the terminal through the second access network device, the second access network device feeds back a result that the terminal has been paged.

Based on the second aspect to the second possible implementation of the second aspect, in a fourth possible implementation of the second aspect, the method further includes: receiving, by the second access network device, a third paging acknowledgement message sent by the third access network device, where the third paging acknowledgement message includes a data forwarding address of the third access network device; determining, by the second access network device based on the third paging acknowledgement message, that the terminal has been paged; and sending, by the second access network device, a second paging acknowledgement message to the first access network device, where the second paging acknowledgement message includes the data forwarding address of the third access network device, where the terminal is under serving coverage of the third access network device, the second access network device and the third access network device are located in a same paging area of the terminal, and the first access network device is not located in a paging area of the terminal.

In the fourth possible implementation of the second aspect, the third access network device is a serving access network device of the terminal. The second access network device pages the terminal through the third access network device located in the same paging area as the second access network device, and the second access network device feeds back, to the first access network device, a result that the terminal has been paged.

Based on any one of the second aspect to the third possible implementation of the second aspect, in a fifth possible implementation of the second aspect, the downlink data is the downlink signaling, and the method further includes: receiving, by the second access network device, the downlink signaling sent by the first access network device; and sending, by the second access network device, the downlink signaling to the terminal. Optionally, the downlink signaling may be sent before the first access network device confirms that the terminal has been paged.

In the fifth possible implementation of the second aspect, the second access network device may send the downlink signaling to the terminal, without needing a data forwarding address of the serving access network device of the terminal.

A third aspect of the embodiments of the present application provides a paging device. The paging device is a first access network device in a wireless communications system, and includes a processor and a transceiver. The processor is configured to execute determining, processing, and another action of the first access network device in the first aspect. The transceiver is configured to execute receiving, sending, and another action of the first access network device in the first aspect. The paging device configured to perform the method in the first aspect has beneficial effects of the first aspect and each possible implementation of the first aspect, and details are not described herein again.

A fourth aspect of the embodiments of the present application provides a paging device. The paging device is a second access network device in a wireless communications system, and includes a receiver, a transmitter, and a processor. The receiver is configured to execute a receiving action of the second access network device in the second aspect, the transmitter is configured to execute a sending action of the second access network device, and the processor is configured to execute determining, processing, and another action of the second access network device. The paging device configured to perform the method in the second aspect has beneficial effects of the second aspect and each possible implementation of the second aspect, and details are not described herein again.

BRIEF DESCRIPTION OF THE DRAWINGS

To describe the technical solutions in the embodiments of the present application more clearly, the following briefly describes the accompanying drawings required for describing the embodiments. Apparently, the accompanying drawings in the following description show some embodiments of the present application, and a person of ordinary skill in the art can still derive other drawings from these accompanying drawings without creative efforts.

DETAILED DESCRIPTION OF ILLUSTRATIVE EMBODIMENTS

In a wireless communications system, one core network device may manage at least one access network device, and each access network device separately provides a communications service for at least one terminal. In a fourth generation wireless communications system, the access network device is an evolved node B (eNB), and the core network device is a mobility management entity or a service gateway. In a third generation mobile communications system, the access network device is a node B, a radio network controller, or a system including a node B and a radio network controller, and the core network device is a serving GPRS (general packet radio service) support node (SGSN) or a GGSN. In a fifth generation wireless communications system, the access network device is a next generation evolved node B, and the core network device is a next generation mobility management entity or a next generation service gateway.

Figure 1A:
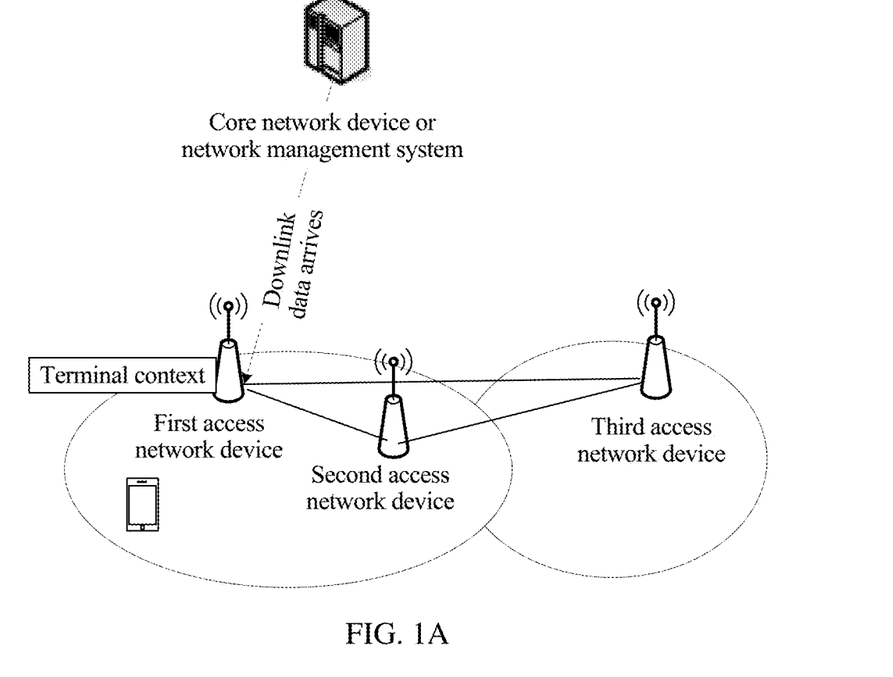
FIG. 1A is a schematic diagram of a system architecture according to an aspect of an embodiment of the present application.
Figure 1B:
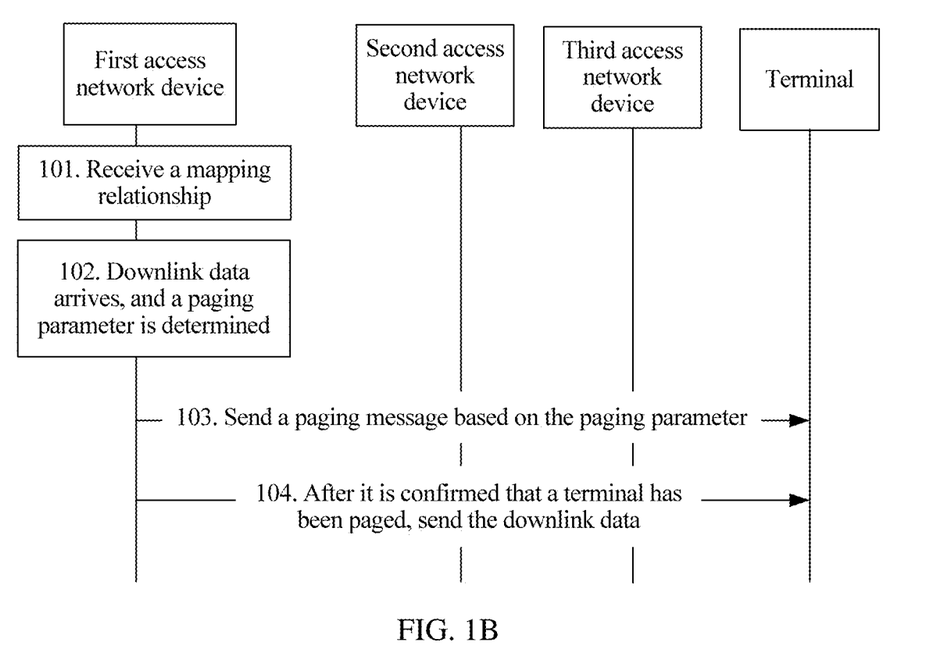
FIG. 1B is a schematic interaction diagram of a paging method according to an aspect of an embodiment of the present application.

An aspect of an embodiment of the present application provides a paging method. As shown in FIG. 1A and FIG. 1B, the method includes the following content.

101. A first access network device receives a mapping relationship between a type of downlink data to a terminal and a paging priority, and the mapping relationship is sent by a core network device or a network management system.

In 101, the downlink data to the terminal may include downlink service data to the terminal, such as voice, a video, and an image, and may include downlink signaling to the terminal, such as NAS stratum signaling or radio resource control (RRC) signaling.

In 101, the mapping relationship is between the type of the downlink data to the terminal and the paging priority, and the mapping relationship is sent by the core network device or the network management system. The mapping relationship may be sent before or when the downlink data to the terminal reaches the first access network device from the core network device.

In 101, as an example, the mapping relationship between the type of the downlink data and the paging priority may be shown in Table 1, and stored on the first access network device.

the network management system, and are sent to the first access network device for storage. Content of Table 1 is only for understanding, and does not constitute a limitation on the embodiments of the present application.

It should be noted that 101 is only an optional implementation, and the foregoing mapping relationship used by the first access network device may also be prestored on the first access network device when the first access network device is manufactured.

102. When the downlink data to the terminal reaches the first access network device from the core network device, the first access network device determines a paging parameter, where the paging parameter is used to send a paging message to the terminal.

In 102, in an optional manner, the paging parameter may include a paging priority of the terminal. The first access network device determines the paging priority of the terminal based on the stored mapping relationship between the type of the downlink data to the terminal and the paging priority of the terminal. If the paging priority of the terminal is relatively high, the terminal may be preferably paged (for example, if currently there are a plurality of terminals to be paged, a terminal with a relatively high paging priority is preferably paged); or if the paging priority of the terminal is relatively low, paging may be abandoned for the terminal. Further, if the downlink data is downlink signaling, the downlink signaling further carries a domain indication, so that the first access network device determines, based on the domain indication, whether the downlink signaling belongs to signaling of a circuit switched (CS) domain, so as to map the paging priority of the terminal based on the signaling of the CS domain.

In 102, optionally, the paging parameter of the terminal further includes a discontinuous reception parameter of the terminal, an identity of the terminal (such as an international mobile subscriber identity, an international mobile user identity, and a D2D identity in a device to device (D2D) wireless communications system), a closed subscriber group (CSG) identity of the terminal, and the like. It should be noted that, in 102, the paging parameter determined by the first access network device may be preconfigured on the first access network device, or configured for the first access network device through the core network device or the network management system, for example, a paging param-

TABLE 1

| | | | Type | | |
| --- | --- | --- | --- | --- | --- |
| | ARP = 1 | ARP = 2 | NAS signaling | Circuit switched domain NAS signaling | Bearer identity = 1 | Bearer identity = 2 |
| Paging priority | 3 | 4 | 2 | 1 | 3 | 4 |

In Table 1, the paging priority uses different numbers to represent priority levels. After downlink data to a plurality of terminals arrives, if paging priorities corresponding to types of the downlink data to the plurality of terminals are sorted in descending order, a terminal with a high paging priority may be preferably paged in the plurality of terminals.

The priority levels corresponding to the types of the downlink data are configured by the core network device or eter corresponding to a type of downlink data to each terminal in a plurality of terminals. Therefore, when downlink data to a terminal reaches the first access network device, the first access network device may quickly determine a paging parameter of the terminal, and further initiate a paging process for this terminal.

Optionally, before 102 or 101, the first access network device notifies the core network device or the network management system that the terminal supports paging initiated by the first access network device, so that the core network device configures the paging parameter for the first access network device.

103. The first access network device sends, based on the paging parameter of the terminal, a paging message to the terminal through the first access network device or a second access network device.

In 103, the first access network device and the second access network device may be located in a same paging area of the terminal, or the first access network device may not be located in a paging area of the terminal. If the first access network device and the second access network device are located in the same paging area, and the first access network device is a serving access network device of the terminal, the first access network device may directly send the paging message to the terminal. If the first access network device is not located in the paging area of the terminal, but the second access network device is located in the paging area of the terminal, the first access network device may send the paging message to the terminal through the second access network device.

It should be noted that the paging area of the terminal is an area in which it is necessary to page the terminal. The area is determined by a wireless communications system (for example, the first access network device or the core network device), and depends on a precision degree perceived by the network device for a location of the terminal. One paging area of the terminal may include one or more access network devices, and the terminal has at least one serving access network device. In 103, if the paging area of the terminal includes the first access network device, the first access network device is the serving access network device of the terminal. The first access network device sends the paging message to the terminal based on the paging parameter of the terminal. Specifically, as the serving access network device of the terminal, the first access network device determines sending time of a paging message based on the discontinuous reception parameter of the terminal, where the paging message carries the identity of the terminal. Alternatively, the paging parameter includes the CSG identity, so that the serving access network device can determine to send the paging message in an access network device cell matching the CSG identity.

In 103, if the paging area of the terminal includes the second access network device, the second access network device is the serving access network device of the terminal. The first access network device sends, based on the paging parameter of the terminal, the paging message to the terminal through the second access network device. For example, the first access network device sends the paging parameter of the terminal to the second access network device. The second access network device may send the paging message to the terminal based on the paging parameter of the terminal.

Optionally, when the first access network device sends the paging parameter of the terminal to the second access network device, a message carrying the paging parameter of the terminal may further include at least one of the following: a context of the terminal, a list of paging cells, and a key of the terminal. The list of paging cells is used by the second access network device to determine in which cell the paging message is sent. The context of the terminal is used when the second access network device receives a connection recovery request sent by the terminal based on the paging message. The second access network device may recover a connection to the terminal based on the context of the terminal. The key is used when the second access network device communicates data with the terminal after recovering the connection to the terminal. The second access network device needs to configure the key for the terminal when the terminal recovers the connection to the second access network device based on the paging message.

104. The first access network device sends the downlink data to the terminal.

In 104, the downlink data is downlink service data or downlink signaling. The first access network device may send the downlink data to the terminal after confirming that the terminal has been paged. As an example, if the terminal is under serving coverage of the first access network device, the first access network device may directly send the downlink data to the terminal. If the terminal is not under serving coverage of the first access network device, the first access network device may forward the downlink data to the terminal through a serving access network device that provides serving coverage for the terminal.

In 104, when the downlink data is the downlink signaling, the first access network device may send the downlink data to the terminal without confirming that the terminal has been paged. For example, the first access network device may send the downlink signaling to the terminal by adding the downlink signaling to the paging message; or the first access network device may forward the downlink signaling for the terminal to the terminal by adding the downlink signaling to the paging message and through the serving access network device that provides serving coverage for the terminal.

In an optional implementation, the first access network device in this embodiment may learn of the paging area of the terminal. If the terminal moves from one paging area to another paging area, the terminal may notify the first access network device of a change of the paging area, so that paging can be more accurately initiated to the terminal when the downlink data to the terminal reaches the first access network device.

It should be noted that, in a possible manner, the terminal in this embodiment of the present application may be in a light connection state. When the terminal and the serving access network device are in an RRC connected state, the terminal may enter the light connection state according to an instruction from the serving access network device. The light connection state may be a sub-state of the RRC connected state, or may be an enhanced state of an idle state, or may be an independent state. The light connection state may also be referred to as an inactive state, a deactivated state, a low active state, a low overhead state, a paging state, or the like. A terminal in the light connection state may be a terminal in the idle state but storing a context related to connection configuration, or may be a mobile terminal in the RRC connection state but allowed to perform cell reselection. For example, when a cell of the terminal in the light connection state is changed, for example, when a cell with better signal quality is measured, the terminal may reselect the cell with better signal quality through cell reselection, without needing a handover instruction from a network side. In this embodiment of the present application, when the terminal is in the light connection state, the context of the terminal may be stored on the terminal, or may be stored on the network side (such as the first access network device), or may be stored on both the network side and on the terminal.

According to technical solution provided in this embodiment of the present application, the downlink data to the terminal reaches the first access network device from the core network and triggers the first access network device to determine the paging parameter and further complete paging for the terminal. The entire paging process does not involves an extra interaction on the core network device, and a large quantity of signaling interaction with the core network device may be reduced, thereby improving performance of the wireless communications system.

Figure 2:
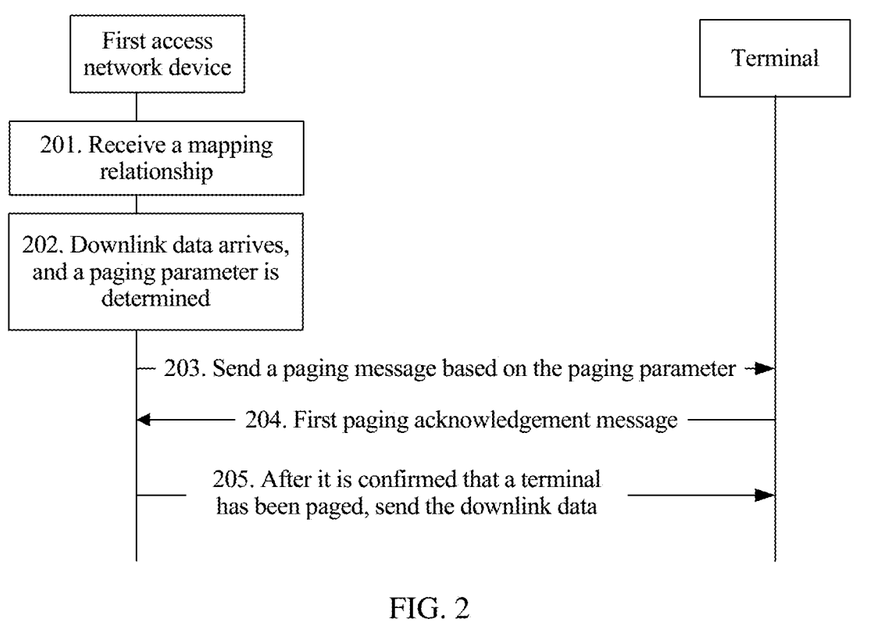
FIG. 2 is a schematic interaction diagram of a paging method according to an aspect of an embodiment of the present application.

An aspect of an embodiment of the present application provides a paging method. As shown in FIG. 2, the method includes the following content.

This embodiment of the present application is a further supplement of the paging method embodiment corresponding to FIG. 1A and FIG. 1B, and same content may be not described again.

In this embodiment of the present application, the paging area includes the first access network device, and the first access network device is a serving access network device of the terminal.

201. A first access network device receives a mapping relationship between a type of downlink data to a terminal and a paging priority, and the mapping relationship is sent by a core network device or a network management system.

202. When the downlink data to the terminal reaches the first access network device from the core network device, the first access network device determines a paging parameter.

In 202, the paging parameter includes a paging priority of the terminal. When the downlink data to the terminal reaches the first access network device, the first access network device may determine the paging priority of the terminal based on the mapping relationship between the type of the downlink data to the terminal and the paging priority. The paging parameter may further include a discontinuous reception parameter of the terminal, a CSG identity of the terminal, and the like.

203. The first access network device sends a paging message to the terminal based on the paging parameter.

Because the terminal is under serving coverage of the first access network device, the first access network device may directly send the paging message to the terminal based on the paging parameter. Optionally, if the downlink data to the terminal is downlink signaling, the paging message may carry the downlink signaling.

204. The terminal sends a first paging acknowledgement message to the first access network device.

The terminal receives the paging message sent by the first access network device, and notifies the first access network device through the first paging acknowledgement message that the terminal has been paged. The first paging acknowledgement message includes paging acknowledgement information. The paging acknowledgement information indicates that the terminal has been paged. The paging acknowledgement message may be specifically an RRC connection establishment request message, or an RRC connection recovery request message.

205. The first access network device confirms that the terminal has been paged, and sends the downlink data to the terminal.

In 205, the downlink data sent by the first access network device to the terminal may be downlink service data or may be downlink signaling.

According to technical solution provided in this embodiment of the present application, the first access network device serves as the serving access network device of the terminal and also an entity for determining the paging parameter after the downlink data arrives, thereby avoiding a large quantity of signaling interaction that is between the core network device and the access network device because the core network device determines the paging parameter.

Figure 3:
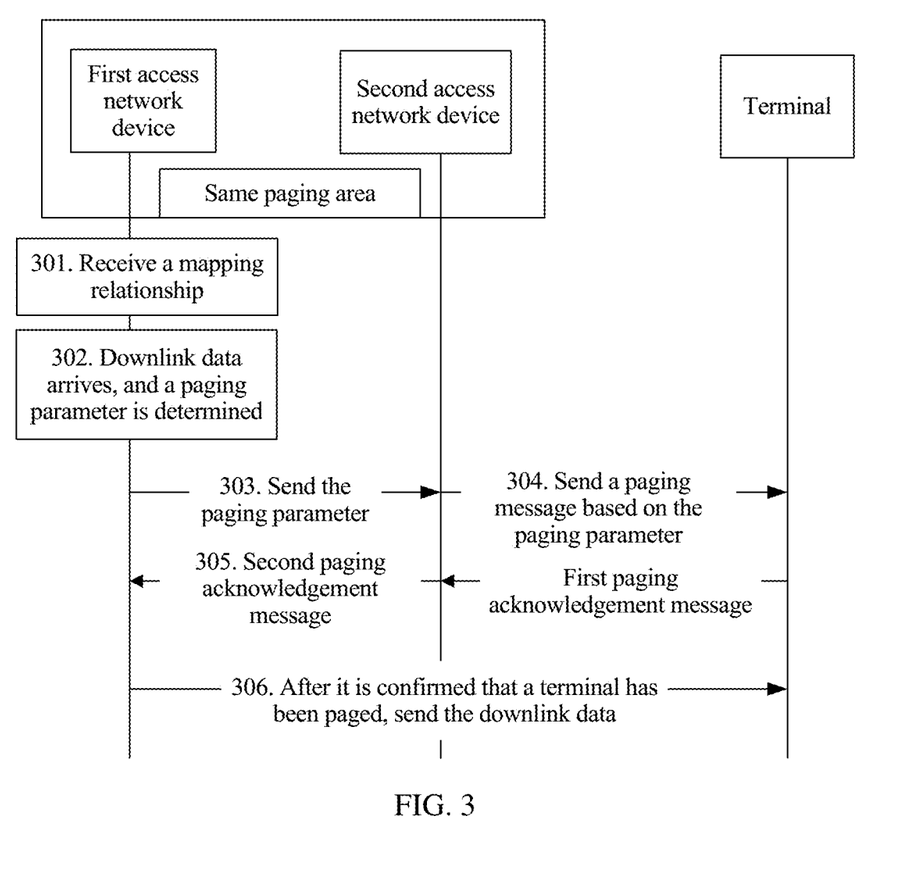
FIG. 3 is a schematic interaction diagram of a paging method according to an aspect of an embodiment of the present application.

An aspect of an embodiment of the present application provides a paging method. As shown in FIG. 3, the method includes the following content.

This embodiment of the present application is a further supplement of the paging method embodiment corresponding to FIG. 1A and FIG. 1B, and same content may be not described again.

In this embodiment of the present application, the paging area includes the second access network device, and the second access network device is a serving access network device of the terminal. The first access network device and the second access network device are located in a same paging area of the terminal, and downlink data to the terminal still reaches the first access network device from the core network device.

301. A first access network device receives a mapping relationship between a type of downlink data to a terminal and a paging priority, and the mapping relationship is sent by a core network device or a network management system.

302. When the downlink data to the terminal reaches the first access network device from the core network device, the first access network device determines a paging parameter.

In 302, the paging parameter includes a paging priority of the terminal. When the downlink data to the terminal reaches the first access network device, the first access network device may determine the paging priority of the terminal based on the mapping relationship between the type of the downlink data to the terminal and the paging priority. The paging parameter may further include a discontinuous reception parameter of the terminal, a CSG identity of the terminal, and the like.

303. The first access network device sends the paging parameter to the second access network device by carrying the paging parameter in a certain message.

Optionally, the message carrying the paging parameter further includes at least one of the following: a context of the terminal, a list of paging cells, and a key of the terminal.

304. The second access network device sends a paging message to the terminal based on the paging parameter.

305. If the terminal has been paged, the second access network device sends a second paging acknowledgement message to the first access network device.

In 305, the second paging acknowledgement message includes paging acknowledgement information. The paging acknowledgement information is used to indicate that the terminal has been paged. The second paging acknowledgement message further includes a data forwarding address of the second access network device.

Specifically, the paging acknowledgement message may be a context request message, a terminal information indication message, and the like.

306. The first access network device determines, based on paging acknowledgement information in the second paging acknowledgement message, that the terminal has been paged under serving coverage of the second access network device, and sends the downlink data to the terminal based on a data forwarding address of the second access network device that is in the second paging acknowledgement message.

Optionally, the first access network device sends context information of the terminal to the second access network device based on the second paging acknowledgement message, so that the second access network device recovers a connection to the terminal based on the context information. Optionally, when the downlink data is downlink signaling, the first access network device may carry the downlink signaling in a message including the context information.

According to technical solution provided in this embodiment of the present application, the downlink data to the terminal reaches the first access network device from the core network device. The first access network device determines the paging parameter and notifies the serving access network device (the second access network device) of the terminal of the paging parameter for paging, thereby avoiding performance deterioration of a wireless communications system caused by a large quantity of signaling interaction between the core network device and the access network device.

Figure 4:
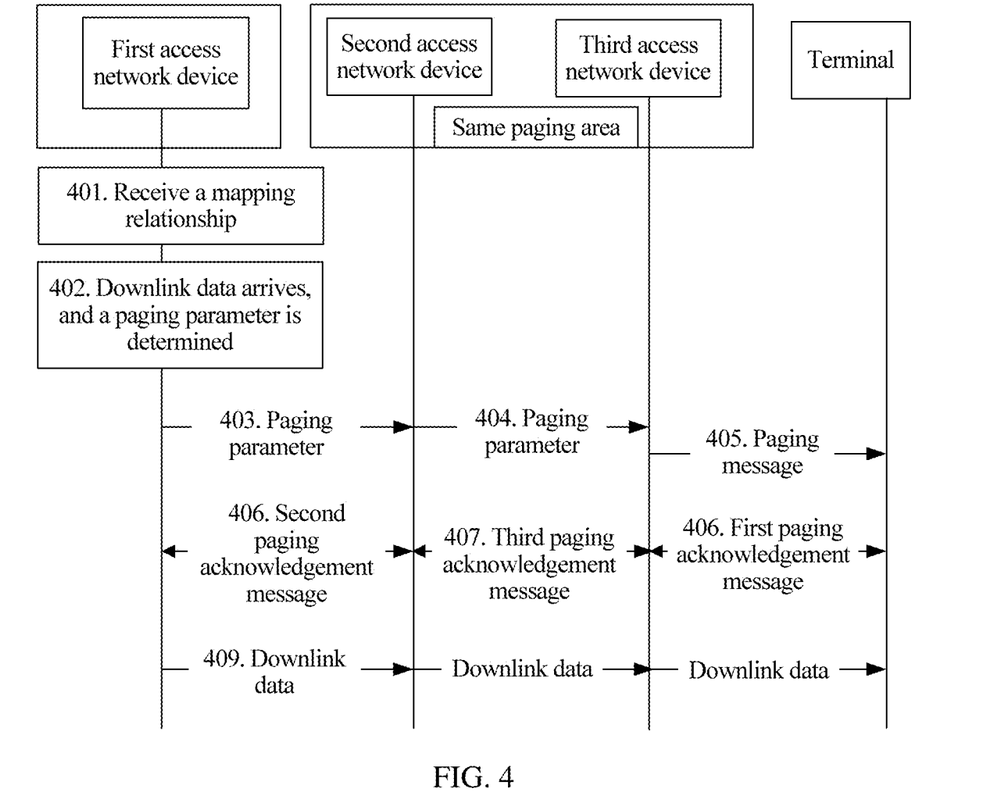
FIG. 4 is a schematic interaction diagram of a paging method according to an aspect of an embodiment of the present application.

An aspect of an embodiment of the present application provides a paging method. As shown in FIG. 4, the method includes the following content.

This embodiment of the present application is a further supplement of the paging method embodiment corresponding to FIG. 1A and FIG. 1B, and same content may be not described again.

In this embodiment of the present application, the paging area includes a second access network device and a third access network device. The third access network device is a serving access network device of the terminal. The first access network device does not belong to a paging area of the terminal.

401. A first access network device receives a mapping relationship between a type of downlink data to a terminal and a paging priority, and the mapping relationship is sent by a core network device or a network management system.

402. When the downlink data to the terminal reaches the first access network device from the core network device, the first access network device determines a paging parameter.

In 402, the paging parameter includes a paging priority of the terminal. When the downlink data to the terminal reaches the first access network device, the first access network device may determine the paging priority of the terminal based on the mapping relationship between the type of the downlink data to the terminal and the paging priority. The paging parameter may further include a discontinuous reception parameter of the terminal, a CSG identity of the terminal, and the like.

403. The first access network device sends the paging parameter to the second access network device by carrying the paging parameter in a message.

404. The second access network device forwards the paging parameter to the third access network device by carrying the paging parameter in a message.

405. The third access network device sends a paging message to the terminal based on the paging parameter.

406. If the terminal has been paged, the terminal sends a first paging acknowledgement message to the third access network device, where the first paging acknowledgement message includes paging acknowledgement information.

407. The third access network device sends a third paging acknowledgement message to the second access network device.

In 407, the third paging acknowledgement message may include paging acknowledgement information to notify that the terminal has been paged, and may further include a data forwarding address of the third access network device.

408. The second access network device sends a second paging acknowledgement message to the first access network device after receiving the third paging acknowledgement message.

In 408, the second paging acknowledgement message includes paging acknowledgement information to notify that the terminal has been paged, and further includes the data forwarding address of the third access network device.

409. The first access network device learns, based on paging acknowledgement information in the second paging acknowledgement message, that the terminal has been paged, and sends the downlink data to the terminal based on a data forwarding address of the third access network device that is in the second paging acknowledgement message and through the third access network device.

According to technical solution provided in this embodiment of the present application, the downlink data to the terminal reaches the first access network device from the core network device. The first access network device determines the paging parameter and notifies the serving access network device (the third access network device) of the terminal of the paging parameter for paging, thereby avoiding performance deterioration of a wireless communications system caused by a large quantity of signaling interaction between the core network device and the access network device.

Figure 5:
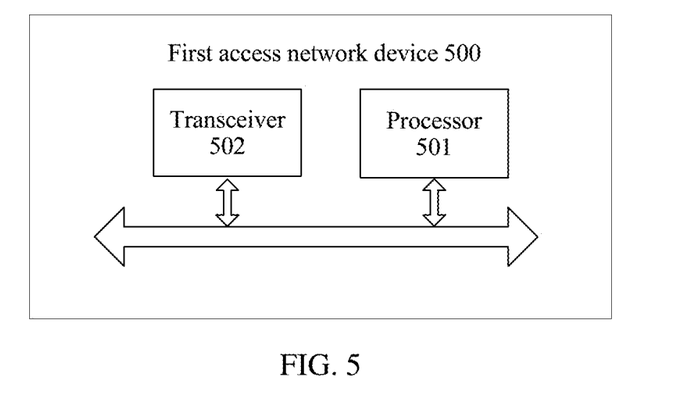
FIG. 5 is a schematic structural diagram of a paging device according to an aspect of an embodiment of the present application.

An aspect of an embodiment of the present application provides a paging device 500. As shown in FIG. 5, the paging device may be, for example, the first access network device in the method embodiments corresponding to FIG. 1A and FIG. 1B and FIG. 2 to FIG. 4. The paging device 500 includes a processor 501 and a transceiver 502. A person skilled in the art may understand that, to implement a connection between the processor 501 and the transceiver, the paging device may further include another electronic circuit such as a bus.

The processor 501 is configured to: when downlink data to a terminal reaches the first access network device from a core network device, determine a paging parameter, where the paging parameter is used to send a paging message to the terminal, and the downlink data is downlink service data or downlink signaling.

The transceiver 502 is configured to send, based on the paging parameter of the terminal, a paging message to the terminal through the first access network device or a second access network device.

Optionally, the paging parameter includes a paging priority of the terminal. The processor 501 is specifically configured to determine the paging priority of the terminal based on a mapping relationship between a type of the downlink data and the paging priority.

Optionally, the transceiver is further configured to receive, by the first access network device, the mapping relationship between the type of the downlink data and the paging priority, and the mapping relationship is sent by the core network device or a network management system.

Optionally, the type of the downlink data includes at least one of the following information: an ARP type, a bearer type of the downlink data or a bearer identity of the downlink data, non-access stratum (NAS) signaling, and circuit switched domain NAS stratum signaling.

Optionally, the transceiver is specifically configured to send the paging parameter of the terminal to the second access network device, where the paging parameter is used by the second access network device to send the paging message to the terminal based on the paging parameter.

Optionally, a message carrying the paging parameter further includes at least one of the following: a context of the terminal, a list of paging cells, and a key of the terminal.

Optionally, the transceiver is further configured to receive a first paging acknowledgement message from the terminal. The processor is further configured to confirm, based on the first paging acknowledgement message, that the terminal has been paged. The transceiver is configured to send the downlink data to the terminal. The terminal is under serving coverage of the first access network device.

Optionally, the transceiver is further configured to receive a second paging acknowledgement message from the second access network device. The second paging acknowledgement message includes a data forwarding address of the second access network device. The processor is further configured to confirm, based on the second paging acknowledgement message, that the terminal has been paged. The transceiver is configured to send the downlink data to the terminal through the second access network device, where the terminal is under serving coverage of the second access network device. The first access network device and the second access network device are located in a same paging area of the terminal.

Optionally, the transceiver is further configured to receive a second paging acknowledgement message from the second access network device. The second paging acknowledgement message includes a data forwarding address of a third access network device. The processor is configured to confirm, based on the second paging acknowledgement message, that the terminal has been paged. The transceiver is configured to send the downlink data to the terminal through the third access network device, where the terminal is under serving coverage of the third access network device. The second access network device and the third access network device are located in a same paging area of the terminal, and the first access network device is not located in a paging area of the terminal.

Optionally, the downlink data is the downlink signaling. The transceiver is configured to send the downlink signaling to the second access network device. The first access network device and the second access network device are located in the same paging area. As an example, the downlink signaling may be sent to the second access network device before the terminal has been paged.

According to technical solution provided in this embodiment of the present application, the first access network device performs paging through the second access network device when the downlink data to the terminal arrives, and the core network device does not need to determine the paging parameter, thereby reducing signaling interaction between a core network and an access network.

Figure 6:
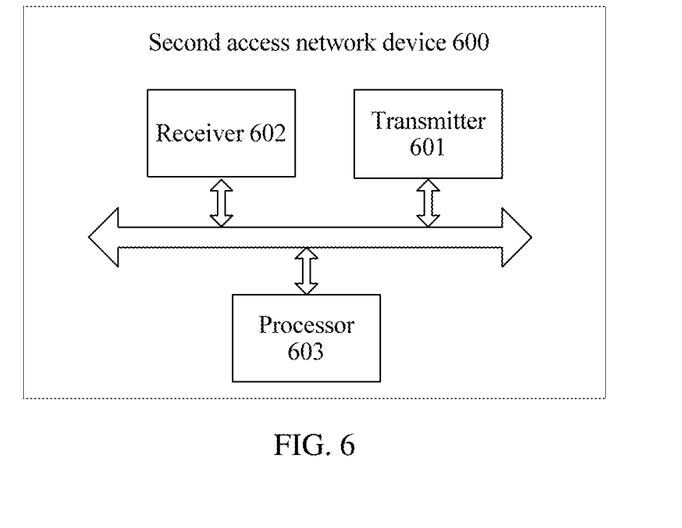
FIG. 6 is a schematic structural diagram of a paging device according to an aspect of an embodiment of the present application.

An aspect of an embodiment of the present application provides a paging device 600. As shown in FIG. 6, the paging device 600 may be, for example, the second access network device in the method embodiments corresponding to FIG. 1A and FIG. 1B and FIG. 2 to FIG. 4. The paging device 600 includes a transmitter 601, a receiver 602, and a processor 603.

A person skilled in the art may understand that, to implement a connection among the processor 603, the transmitter 601, and the receiver 602, the paging device may further include another electronic circuit such as a bus.

The receiver is configured to receive a paging parameter determined by a first access network device after downlink data to a terminal reaches the first access network device, where the paging parameter is used to send a paging message to the terminal, and the downlink data is downlink service data or downlink signaling.

The transmitter is configured to send, based on the paging parameter, a paging message to the terminal through the second access network device or a third access network device.

Optionally, the paging parameter is a paging priority of the terminal.

Optionally, a message carrying the paging parameter further includes at least one of the following: a context of the terminal, a list of paging cells, and a key of the terminal.

Optionally, the transmitter is configured to: after the second access network device confirms that the terminal has been paged, send a second paging acknowledgement message to the first access network device. The second paging acknowledgement message includes a data forwarding address of the second access network device, the terminal is under serving coverage of the second access network device, and the first access network device and the second access network device are located in a same paging area of the terminal.

Optionally, the receiver is further configured to receive a third paging acknowledgement message sent by the third access network device. The third paging acknowledgement message includes a data forwarding address of the third access network device. The device further includes the processor, configured to confirm, based on the third paging acknowledgement message, that the terminal has been paged. The transmitter is further configured to send a second paging acknowledgement message to the first access network device. The second paging acknowledgement message includes the data forwarding address of the third access network device. The terminal is under serving coverage of the third access network device. The second access network device and the third access network device are located in a same paging area of the terminal, and the first access network device is not located in a paging area of the terminal.

Optionally, the downlink data is the downlink signaling. The receiver is further configured to receive the downlink signaling sent by the first access network device. The transmitter is further configured to send the downlink signaling to the terminal before the first access network device confirms that the terminal has been paged.

According to technical solutions provided in this embodiment of the present application, the first access network device performs paging through the second access network device when the downlink data to the terminal arrives, and the core network device does not need to determine the paging parameter, thereby reducing signaling interaction between a core network and an access network.

A person of ordinary skill in the art may understand that all or a part of the processes of the method in the embodiments may be implemented by a computer program instructing relevant hardware. The program may be stored in a computer readable storage medium. When the program runs, the processes of the methods in the embodiments are performed. The foregoing storage medium includes any medium that can store program code, such as a ROM, a RAM, a magnetic disk, or an optical disc.

What is disclosed above is merely example embodiments of the present application, and certainly is not intended to limit the protection scope of the present application. A person of ordinary skill in the art may understand that all or some of processes that implement the foregoing embodiments and equivalent modifications made in accordance with the claims of the present application shall fall within the scope of the present application.

The invention claimed is:

1. A method, comprising:
   in response to downlink data being sent to a terminal reaching a first access network device from a core network device, determining, by the first access network device, a paging parameter of the terminal, wherein the downlink data is downlink service data or downlink signaling, the paging parameter of the terminal comprises a paging priority of the terminal, and wherein determining the paging parameter of the terminal comprises:

determining, by the first access network device, the paging priority of the terminal based on a mapping relationship between a type of the downlink data and the paging priority of the terminal, wherein the type of the downlink data comprises: an allocation and retention priority (ARP) type, a non-access stratum (NAS) signaling type, or both the ARP type and the NAS signaling type; and sending, by the first access network device, a message based on the paging parameter of the terminal, wherein sending the message based on the paging parameter of the terminal comprises:

sending, based on the paging parameter of the terminal, a paging message to the terminal; or sending the paging parameter of the terminal to a second access network device to page the terminal.

2. The method according to claim 1, further comprising:
receiving, by the first access network device from a network management system, the mapping relationship between the type of the downlink data and the paging priority of the terminal.

3. The method according to claim 1, wherein the terminal is in an inactive state, the inactive state is a radio resource control (RRC) connection state, and in the RRC connection state the terminal is allowed to perform cell selection and a context of the terminal is kept in the first access network device.

4. The method according to claim 1, wherein sending the message based on the paging parameter of the terminal comprises:
sending the paging message to the terminal.

5. The method according to claim 1, wherein sending the message based on the paging parameter of the terminal comprises:
sending the paging parameter of the terminal to the second access network device to cause the second access network device to page the terminal.

6. A first access network device, comprising:
a processor, configured to:
in response to downlink data being sent to a terminal reaching the first access network device from a core network device, determine a paging parameter of the terminal, wherein the downlink data is downlink service data or downlink signaling, the paging parameter of the terminal comprises a paging priority of the terminal, and wherein determining the paging parameter of the terminal comprises:
determining the paging priority of the terminal based on a mapping relationship between a type of the downlink data and the paging priority of the terminal, wherein the type of the downlink data comprises: an allocation and retention priority (ARP) type, a non-access stratum (NAS) signaling type, or both the ARP type and the NAS signaling type; and a transceiver, configured to:
send, based on the paging parameter of the terminal, a paging message to the terminal; or
send the paging parameter of the terminal to a second access network device to page the terminal.

7. The device according to claim 6, wherein the transceiver is further configured to receive, from a network management system, the mapping relationship between the type of the downlink data and the paging priority of the terminal.

8. The device according to claim 6, wherein the terminal is in an inactive state, the inactive state is a radio resource control (RRC) connection state, and in the RRC connection state the terminal is allowed to perform cell selection and a context of the terminal is kept in the first access network device.

9. The device according to claim 6, wherein the transceiver is configured to:
send, based on the paging parameter of the terminal, the paging message to the terminal.

10. The device according to claim 6, wherein the transceiver is configured to:
send the paging parameter of the terminal to the second access network device to cause the second access network device to page the terminal.

11. A wireless communications system, comprising:
a first access network device, configured to:
in response to downlink data being sent to a terminal reaching the first access network device from a core network device, determine a paging parameter of the terminal, wherein the downlink data is downlink service data or downlink signaling, the paging parameter of the terminal comprises a paging priority of the terminal, and determining the paging parameter of the terminal comprises:
determine the paging priority of the terminal based on a mapping relationship between a type of the downlink data and the paging priority of the terminal, wherein the type of the downlink data comprises: an allocation and retention priority (ARP) type, a non-access stratum (NAS) signaling type, or both the ARP type and the NAS signaling type; and
send the paging parameter of the terminal to a second access network device to page the terminal; and
the second access network device, configured to:
receive the paging parameter of the terminal from the first access network device; and
page the terminal based on the paging parameter of the terminal.

12. The system according to claim 11, wherein the first access network device is further configured to:
receive, from a network management system, the mapping relationship between the type of the downlink data and the paging priority of the terminal.

13. The system according to claim 11, wherein the terminal is in an inactive state, the inactive state is a radio resource control (RRC) connection state, and in the RRC connection state the terminal is allowed to perform cell selection and a context of the terminal is kept in the first access network device.

* * * * *